US009247715B2

(12) United States Patent
Jaw

(10) Patent No.: US 9,247,715 B2
(45) Date of Patent: Feb. 2, 2016

(54) QUICK-ADJUSTABLE ANIMAL COLLAR

(71) Applicant: Ben Jaw, Taichung (TW)

(72) Inventor: Ben Jaw, Taichung (TW)

( * ) Notice: Subject to any disclaimer, the term of this patent is extended or adjusted under 35 U.S.C. 154(b) by 84 days.

(21) Appl. No.: 14/165,650

(22) Filed: Jan. 28, 2014

(65) Prior Publication Data
US 2015/0150220 A1  Jun. 4, 2015

(30) Foreign Application Priority Data
Nov. 29, 2013  (CN) .......................... 2013 1 0629071

(51) Int. Cl.
*A01K 27/00*  (2006.01)
(52) U.S. Cl.
CPC ............. *A01K 27/001* (2013.01); *A01K 27/005* (2013.01)
(58) Field of Classification Search
CPC .......................... A01K 27/001; A01K 27/005
See application file for complete search history.

(56) References Cited

U.S. PATENT DOCUMENTS 4,091,766 A * 5/1978 Colliard .................. 359/518
5,785,010 A * 7/1998 Koch ....................... 119/863
6,129,055 A * 10/2000 Hanada .................... 119/863

FOREIGN PATENT DOCUMENTS

CN          101543188 A    9/2009

* cited by examiner

*Primary Examiner* — Kristen C Hayes
(74) *Attorney, Agent, or Firm* — Alan D. Kamrath; Kamrath IP Lawfirm, P.A.

(57) ABSTRACT

A quick-adjustable animal collar includes a buckle including a female buckle member and a male buckle member releasably engaged with each other and including a strap adjusting structure. At least one strap is attached to the buckle. The at least one strap extends between the female and male buckle members. The at least one strap includes a first length slidable through the strap adjusting structure in a non-overlapped manner and having a free end. The size of the quick-adjustable animal collar changes with adjusting the first length of the at least one strap, with the first length of the at least one strap including an increased extent disposed within a circumference of the quick-adjustable animal collar as the size of the quick-adjustable animal collar is reduced.

9 Claims, 6 Drawing Sheets

QUICK-ADJUSTABLE ANIMAL COLLAR

BACKGROUND OF THE INVENTION

1. Field of the Invention

The present invention relates to an animal collar and, particularly to a quick-adjustable animal collar.

2. Description of the Related Art

China Patent Publication No. CN101543188 shows a pet collar. The size of the pet collar is adjustable. The pet collar includes a first band inserted through a first strap adjuster and connecting to a second strap adjuster. The pet collar also includes a second band inserted through the second strap and connecting to the first strap. The first and second bands between the first and second strap adjusters are overlapped, and the size of the pet collar is changed with adjusting the lengths of the first and second bands between the first and second strap adjusters. However, a user would find making a quick adjustment has never been easy, and even more difficult when the pet collar is already put on the animal.

The present invention is, therefore, intended to obviate or at least alleviate the problems encountered in the prior art.

SUMMARY OF THE INVENTION

According to the present invention, a quick-adjustable animal collar includes a buckle including a female buckle member and a male buckle member releasably engaged with each other and including a strap adjusting structure. At least one strap is attached to the buckle. The at least one strap extends between the female and male buckle members. The at least one strap includes a first length slidable through the strap adjusting structure in a non-overlapped manner and having a free end.

The quick-adjustable animal collar has a size defining a circumferential area, and the size changes with adjusting the first length of the at least one strap, with the first length of the at least one strap including an increased extent disposed within a circumference of the quick-adjustable animal collar as the size of the quick-adjustable animal collar is reduced.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
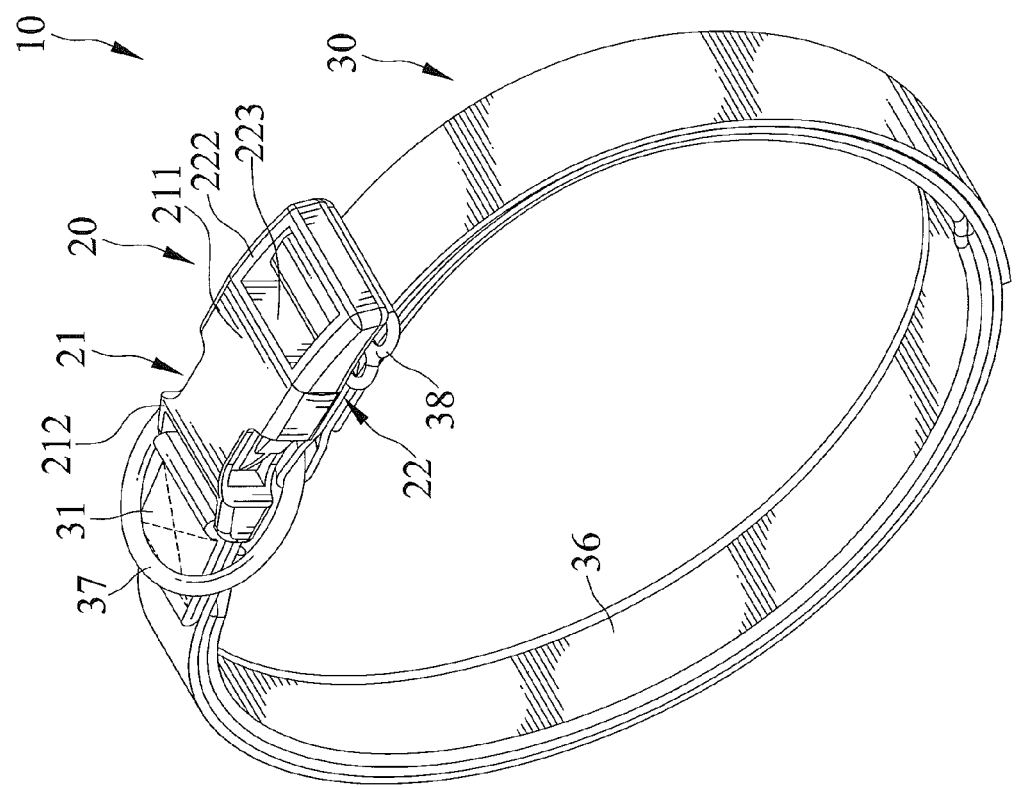
FIG. 1 is a perspective view of a quick-adjustable animal collar in accordance with a first embodiment of the present invention, with the quick-adjustable animal collar in a buckled up position.
Figure 2:
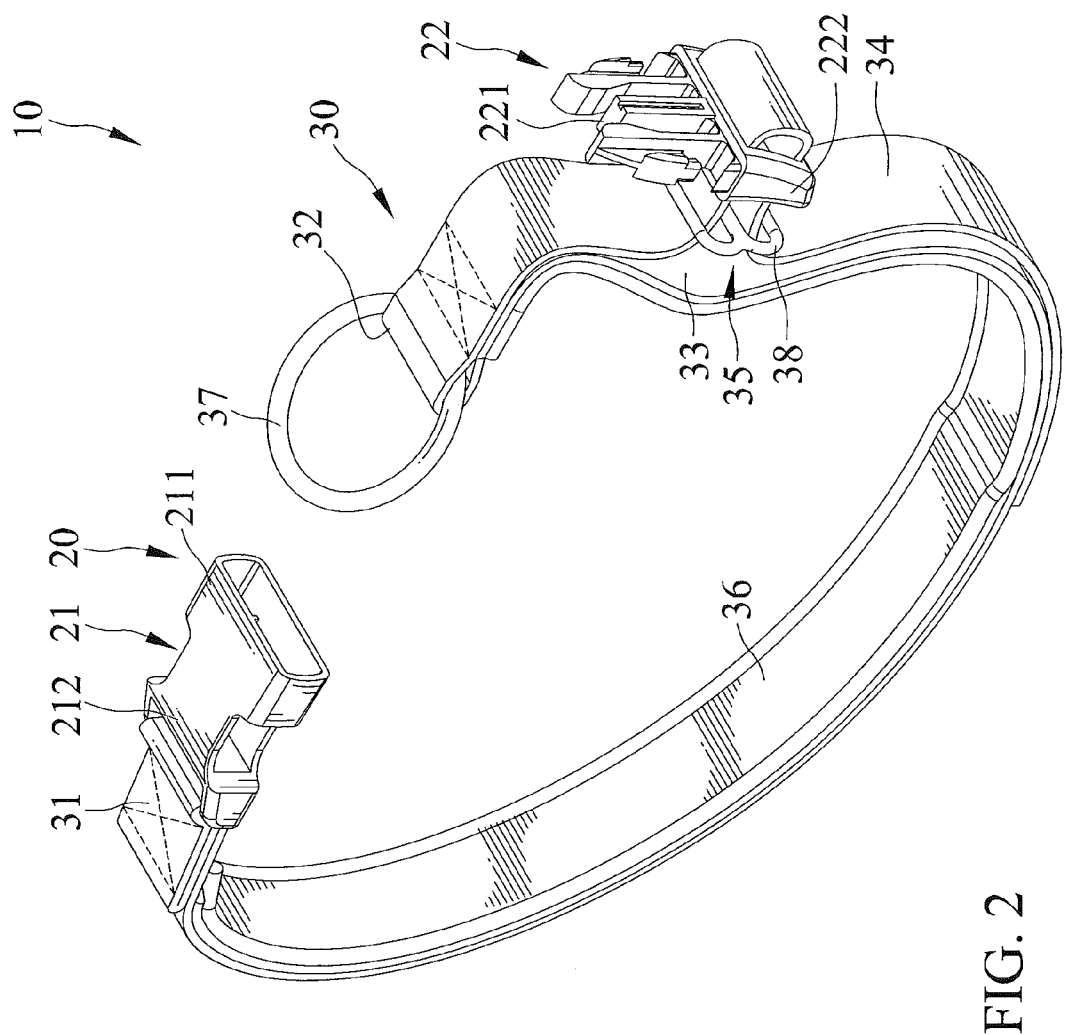
FIG. 2 is a perspective view of the quick-adjustable animal collar of FIG. 1, with the quick-adjustable animal collar in an unbuckled position.
Figure 3:
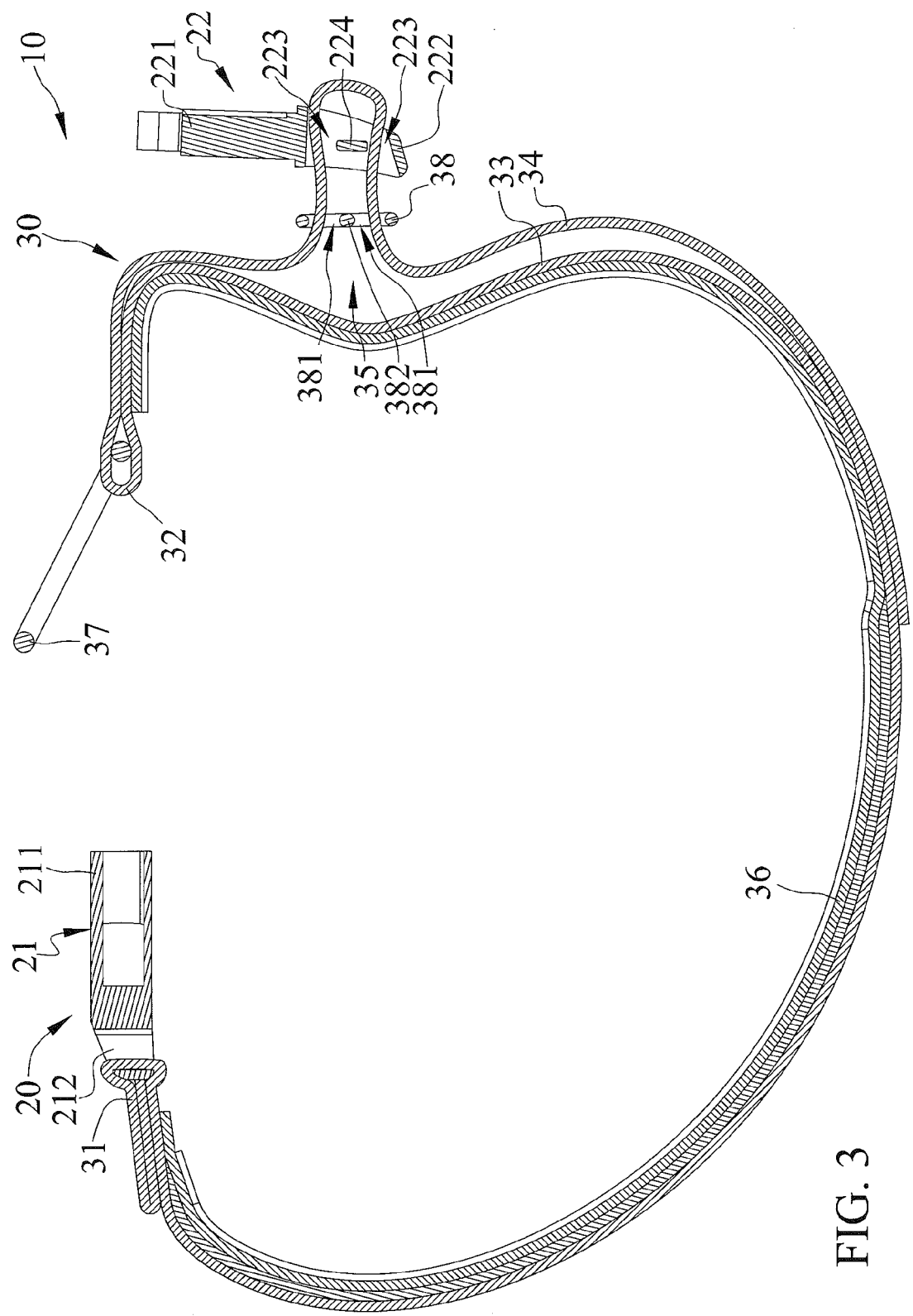
FIG. 3 is a cross-sectional view of FIG. 2.
Figure 4:
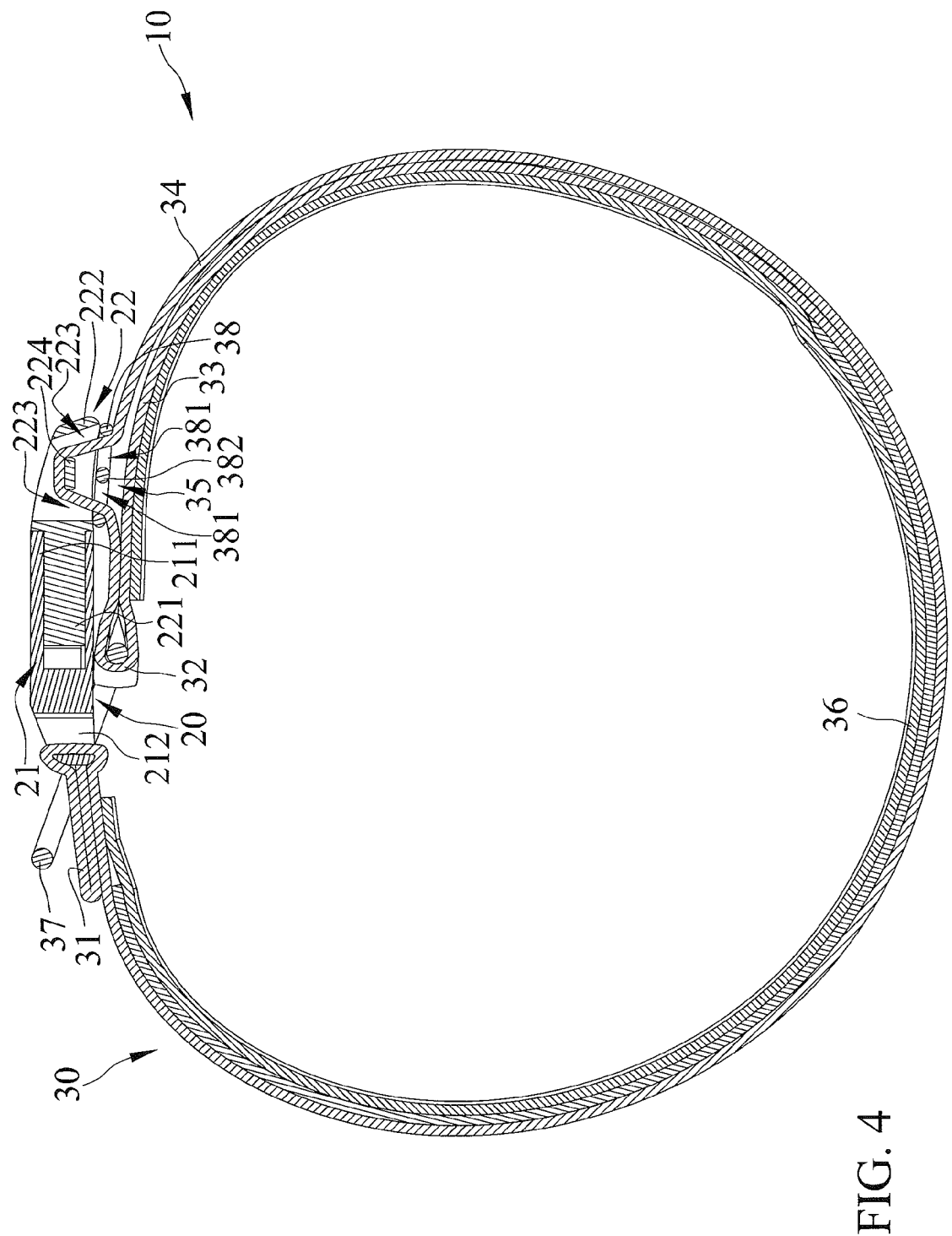
FIG. 4 is a cross-sectional view of FIG. 1.
Figure 5:
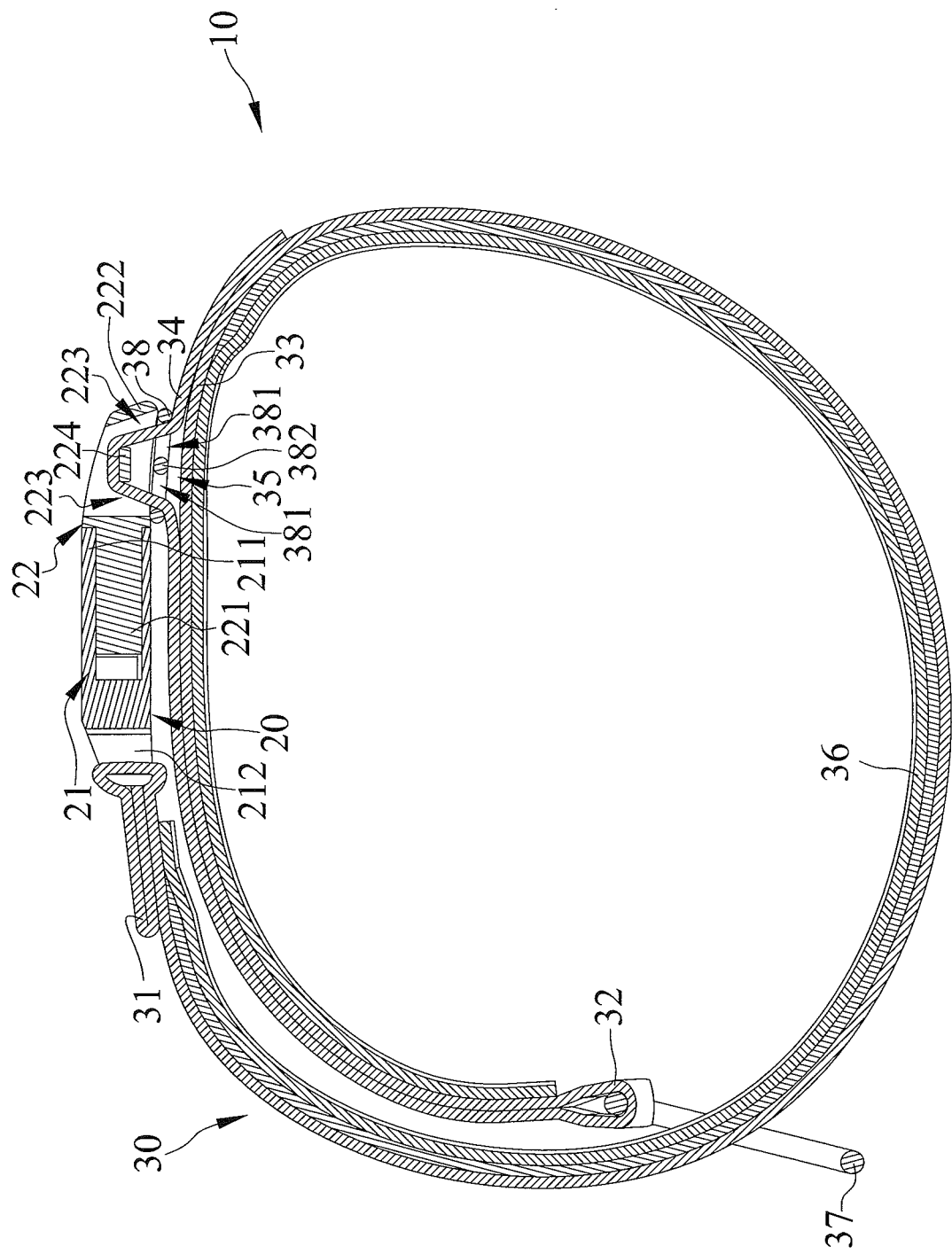
FIG. 5 is a cross-sectional view showing the quick-adjustable animal collar of FIG. 1 adjusted to another size.

FIGS. 1 through 5 show a quick-adjustable animal collar 10 in accordance with a first embodiment of the present invention. The quick-adjustable animal collar 10 includes a buckle 20 and at least one strap 30.

The buckle 20 includes a female buckle member 21 and a male buckle member 22 releasably engaged with each other. The female buckle 21 defines a first engaging end 211, and the male buckle 22 defines a second engaging end 221 that releasably engages with the first engaging end 211. The first engaging end 211 delimits a pocket. The pocket includes at least one holding structure. The at least one holding structure is in the form of a through recess. The second engaging end 221 is a resilient catch. The resilient catch includes at least one flex arm. The at least one flex arm is in the form of a hook. In the embodiment, the resilient catch has two flex arms, and the two flex arms are mirroring structures of one another. When the buckle 20 is buckled up, the resilient catch is received in the pocket, with the at least one flex arm received in the pocket and including an enlarged portion, which projects laterally outward from a longitudinal axis of the flex arm, engaged with and restrained by the holding structure. Moreover, the buckle 20 and includes a strap adjusting structure 222. The strap adjusting structure 222 includes two through holes 223 and an extension 224 between the two through holes 223. The strap adjusting structure 222 is integrated with the buckle 20.

The at least one strap 30 is attached to the buckle 20 and extends between the female and male buckle members 21 and 22. The at least one strap 30 has a first end 31 attached to the female buckle member 21 and a second end 32 attached to the male buckle member 22 is respectively, and the first and second ends 31 and 32 define two distal ends of the at least one strap 30. The female buckle member 21 defines a connecting end 212, and the first end 31 of the at least one strap 30 is attached to the connecting end 212. In the embodiment, the first end 31 of the at least one strap 30 is fixedly connected to the connecting end 212, but the invention is not limited thereto.

The at least one strap 30 includes a first length slidable through the strap adjusting structure 222 in a non-overlapped manner and having a free end. Moreover, the at least one strap 30 includes a second length corresponding to and disposed underneath the first length, and includes the first and second lengths thereof delimiting an enclosed area 35. The first length of the at least one strap 30 is an outer layer 34, and the second length of the at least one strap 30 is an inner layer 33, respectively. The size of the quick-adjustable animal collar 10 changes with adjusting the first length of the at least one strap 30, with the first length of the at least one strap 30 including an increased extent disposed within a circumference of the quick-adjustable animal collar 10 as the size of the quick-adjustable animal collar 10 is reduced. Changing the size of the quick-adjustable animal collar 10 means a circumferential area thereof is changed. Moreover, the quick-adjustable animal collar 10 with a predetermined size, which includes the first length of the at least one strap 30 including an extent that is not disposed within the circumference of the quick-adjustable animal collar 10, includes the extent on the circumference of the quick-adjustable animal collar 10.

Further, a soft lining 36 is attached to an inner periphery of the circumference of the quick-adjustable animal collar 10, with the soft lining 36 attached to the at least one strap 30. The soft lining 36 ensures optimal comfort for an animal who wears it. Also, the first length of the at least one strap 30 includes the free end securing a ring 37. The female buckle member 21 is insertable through the ring 37, and the ring 37 hangs to different positions of the at least one strap 30 adjacent to the female buckle member 21 with respect to different sizes of the quick-adjustable animal collar 10. The ring 37 can facilitate a user's effort to slide the first length of the strap 30 that is slidable through the strap adjusting structure 222 of the buckle 20. Further, a slider 38 is slidable on the first length of the at least one strap 30. The slider 38 includes two through slots 381 and a bar 382 between the two through slots 381, and the first length of the at least one strap 30 is inserted through the two through slots 381. The slider 38 is movable to a position abutting against the strap adjusting structure 222, and the at least one strap 30 is prevented from sliding relative to the strap adjusting structure 222.

Figure 6:
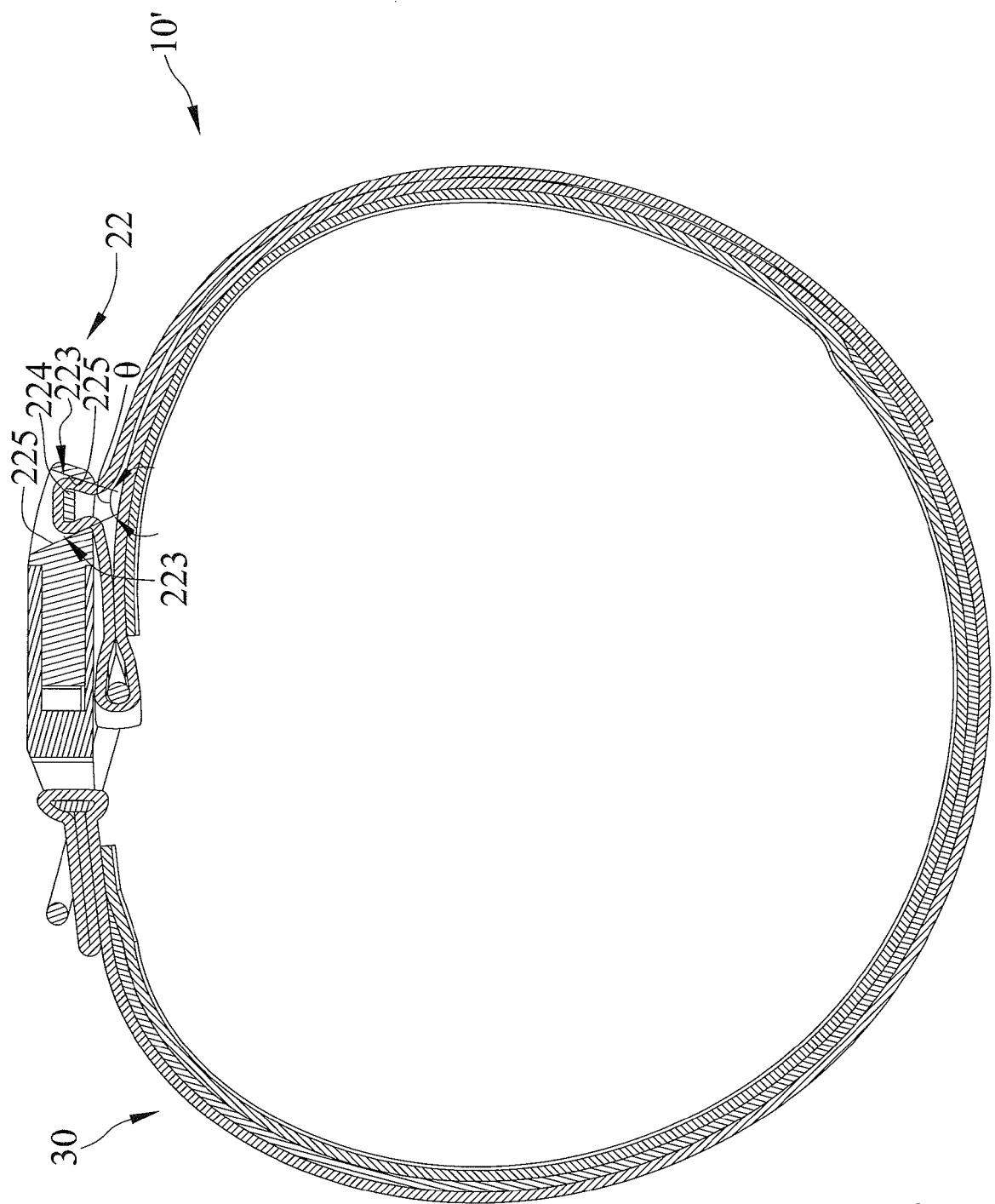
FIG. 6 is a cross-sectional view of a quick-adjustable animal collar in accordance with a second embodiment of the present invention, with the quick-adjustable animal collar in a buckled up position.

FIG. 6 shows a quick-adjustable animal collar 10' in accordance with a second embodiment of the present invention. The second embodiment differentiates from the first embodiment in that each of the two through holes 223 is delimited by an edge 225 of the strap adjusting structure 222, and in that the first length of the at least one strap 30 abuts against the edge 225. The edges 225 are opposite to and angled with respect to each other. The edges 225 are tilted from each other with an angle $\theta$ greater than 30 and less than 60 degrees.

In view of the forgoing, the quick-adjustable animal collars 10 and 10' are size adjustable, and a user can adjust it in an easy and quick manner. The size of the quick-adjustable animal collar 10 changes with adjusting the first length of the at least one strap 30. In addition, the ring 37 can facilitate a user's effort to slide the first length of the strap 30 that is slidable through the strap adjusting structure 222 of the buckle 20 for changing the size of the quick-adjustable animal collars 10 and 10'.

While the specific embodiments have been illustrated and described, numerous modifications come to mind without significantly departing from the spirit of invention, and the scope of invention is only limited by the scope of accompanying claims.

What is claimed is:

1. A quick-adjustable animal collar comprising:
    a buckle including a female buckle member and a male buckle member releasably engaged with each other;
    a strap adjusting structure; and
    at least one strap attached to the buckle, extending between the female and male buckle members, including a first length slidable through the strap adjusting structure in a non-overlapped manner, and having a free end;
    wherein the buckle, the strap adjusting structure and the at least one strap have a size defining a circumferential area, wherein the size changes with adjusting the first length of the at least one strap, with the first length of the at least one strap including an increased extent disposed in a circumference as the size is reduced, and wherein the at least one strap includes a second length corresponding to and disposed underneath the first length, and includes the first and second lengths thereof delimiting an enclosed area.

2. The quick-adjustable animal collar as claimed in claim 1, wherein the strap adjusting structure includes two through holes and an extension between the two through holes.

3. The quick-adjustable animal collar as claimed in claim 1, wherein the female buckle defines a first engaging end, wherein the male buckle defines a second engaging end releasably engages with the first engaging end, wherein the first engaging end delimits a pocket, wherein the pocket includes at least one holding structure, wherein the second engaging end is a resilient catch, and wherein the resilient catch includes at least one flex arm.

4. The quick-adjustable animal collar as claimed in claim 3, wherein the at least one holding structure is in the form of a through recess, and wherein when the buckle is buckled up, the resilient catch is received in the pocket, with the at least one flex arm received in the pocket and including an enlarged portion, which projects laterally outward from a longitudinal axis of the flex arm, engaged with and restrained by the holding structure.

5. The quick-adjustable animal collar as claimed in claim 1 further comprising a soft lining on an inner periphery of a circumference of the buckle, the strap adjusting structure and the at least one strap, with the soft lining attached to the at least one strap.

6. A quick-adjustable animal collar comprising:
    a buckle including a female buckle member and a male buckle member releasably engaged with each other;
    a strap adjusting structure; and
    at least one strap attached to the buckle, extending between the female and male buckle members, including a first length slidable through the strap adjusting structure in a non-overlapped manner, and having a free end;
    wherein the buckle, the strap adjusting structure and the at least one strap have a size defining a circumferential area, wherein the size changes with adjusting the first length of the at least one strap, with the first length of the at least one strap including an increased extent disposed in a circumference as the size is reduced, wherein the strap adjusting structure is integrated with the buckle, wherein the first length of the at least one strap includes the free end securing a ring, wherein the female buckle member is insertable through the ring, and wherein the ring hangs to different positions of the at least one strap adjacent to the female buckle member with respect to different sizes of the quick-adjustable animal collar.

7. The quick-adjustable animal collar as claimed in claim 6, wherein the ring is fixedly connecting to the free end of the first length of the at least one strap.

8. A quick-adjustable animal collar comprising:
a buckle including a female buckle member and a male buckle member releasably engaged with each other;
a strap adjusting structure;
at least one strap attached to the buckle, extending between the female and male buckle members, including a first length slidable through the strap adjusting structure in a non-overlapped manner, and having a free end;
wherein the buckle, the strap adjusting structure and the at least one strap have a size defining a circumferential area, wherein the size changes with adjusting the first length of the at least one strap, with the first length of the at least one strap including an increased extent disposed in a circumference as the size is reduced; and
a slider slidable on the first length of the at least one strap, wherein the slider includes two through slots and a bar between the two through slots, wherein the first length of the at least one strap is inserted through the two through slots, wherein the slider is movable to a position abutting against the strap adjusting structure, and wherein the at least one strap is prevented from sliding relative to the strap adjusting structure.

9. A quick-adjustable animal collar comprising:
a buckle including a female buckle member and a male buckle member releasably engaged with each other;
a strap adjusting structure; and
at least one strap attached to the buckle, extending between the female and male buckle members, including a first length slidable through the strap adjusting structure in a non-overlapped manner, and having a free end;
wherein the buckle, the strap adjusting structure and the at least one strap have a size defining a circumferential area, wherein the size changes with adjusting the first length of the at least one strap, with the first length of the at least one strap including an increased extent disposed in a circumference as the size is reduced, wherein the strap adjusting structure includes two through holes and an extension between the two through holes, wherein each of the two through holes is delimited by an edge of the strap adjusting structure, wherein the first length of the at least one strap abuts against the edge, and wherein the edges are opposite to and angled with respect to each other, with the edges tilted from each other with an angle greater than 30 and less than 60 degrees.

* * * * *